United States Patent
Nghiem

(10) Patent No.: US 11,863,693 B2
(45) Date of Patent: Jan. 2, 2024

(54) PASSIVE DIRECTIVITY ENHANCEMENT FOR WIRELESS DEVICE

(71) Applicant: Arthur Jason Nghiem, Shoreview, MN (US)

(72) Inventor: Arthur Jason Nghiem, Shoreview, MN (US)

( * ) Notice: Subject to any disclaimer, the term of this patent is extended or adjusted under 35 U.S.C. 154(b) by 331 days.

(21) Appl. No.: 17/449,989

(22) Filed: Oct. 5, 2021

(65) Prior Publication Data
US 2023/0104167 A1    Apr. 6, 2023

(51) Int. Cl.
  *H04M 1/02* (2006.01)
  *H01Q 1/24* (2006.01)

(52) U.S. Cl.
  CPC ............. *H04M 1/026* (2013.01); *H01Q 1/24* (2013.01)

(58) Field of Classification Search
  CPC ........ H01Q 1/24; H01Q 1/243; H01Q 19/104; H01Q 19/108; H01Q 9/30; H04M 1/026
  USPC ...................................... 455/575.7
  See application file for complete search history.

(56) References Cited

U.S. PATENT DOCUMENTS

| | | | |
|---|---|---|---|
| 8,208,980 B2 | 6/2012 | Wong et al. | |
| 8,708,240 B2 | 4/2014 | Finn | |
| 2005/0068245 A1 | 3/2005 | Chen | |
| 2014/0266921 A1* | 9/2014 | Joshi | A61N 1/37229 |
| | | | 343/702 |
| 2016/0275393 A1* | 9/2016 | Jain | G06K 19/07794 |
| 2016/0380335 A1* | 12/2016 | Jeong | H01Q 1/50 |
| | | | 343/702 |
| 2017/0033434 A1* | 2/2017 | Hong | H01Q 1/42 |
| 2017/0142241 A1* | 5/2017 | Kim | H04M 1/026 |
| 2019/0109622 A1* | 4/2019 | Wang | H04B 7/0452 |

OTHER PUBLICATIONS

"Chinese Application Serial No. 202222534118.5, Notification to Make Rectification dated Dec. 14, 2022", w English Translation, 3 pgs.
"The 25 Best Cell Pone Signal Boosters", [Online]. Retrieved from the Internet: URL: https: www.ubersignal.com cell-phone-signal-booster-guide, (Sep. 14, 2021), 94 pgs.
"Cell Phone Signal Enhancement Stickers-Signal Booster, SP-3 Mobile Phone Signal Amplifier, Cell Phone Antenna Boosters, for Travel, Mountain, Outdoor Camping", Amazon.com, (Sep. 14, 2021), 5 pgs.
"6 Pack Cell Phone and PDA Antenna Booster", Amazon.com, (Sep. 14, 2021), 6 pgs.

(Continued)

*Primary Examiner* — Tan H Trinh
(74) *Attorney, Agent, or Firm* — Schwegman Lundberg Woessner, P.A.

(57) ABSTRACT

Apparatus and techniques described herein can provide enhanced wireless communication range for a wireless device without requiring additional external active circuitry, such as using a simple mechanical and electrical configuration as compared to using an active antenna booster device. Generally, the apparatus and techniques described herein can be used to enhance a directivity of a wireless device antenna using a passive attachment. For example, a directivity of a first antenna can be enhanced without substantially affecting the directivity or performance of another antenna on or within the wireless device.

20 Claims, 7 Drawing Sheets

(56) References Cited

OTHER PUBLICATIONS

"Passive Antenna Booster Repeater for Cars and Trucks", [Online]. Retrieved from the Internet: URL: https: www.signalbooster.com products passive-antenna-booster-repeater-for-cars-and-trucks, (Sep. 14, 2021), 8 pgs.

"Wilson Cradle Boosters", [Online]. Retrieved from the Internet: URL: https: www.wilsonsignalbooster.com vehicle-cell-phone-signal-boosters cradle-boosters.html, (Sep. 14, 2021), 2 pgs.

* cited by examiner

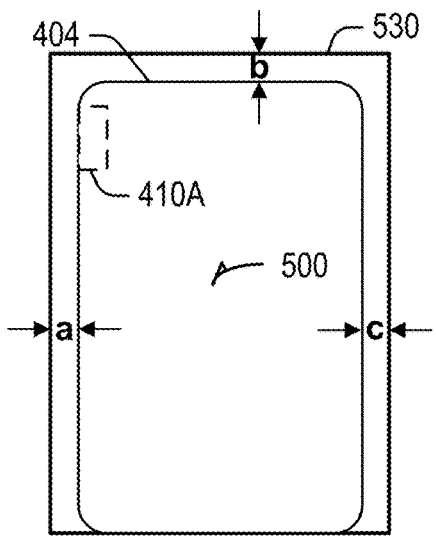
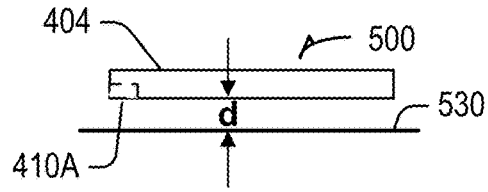
FIG. 5A
FIG. 5B
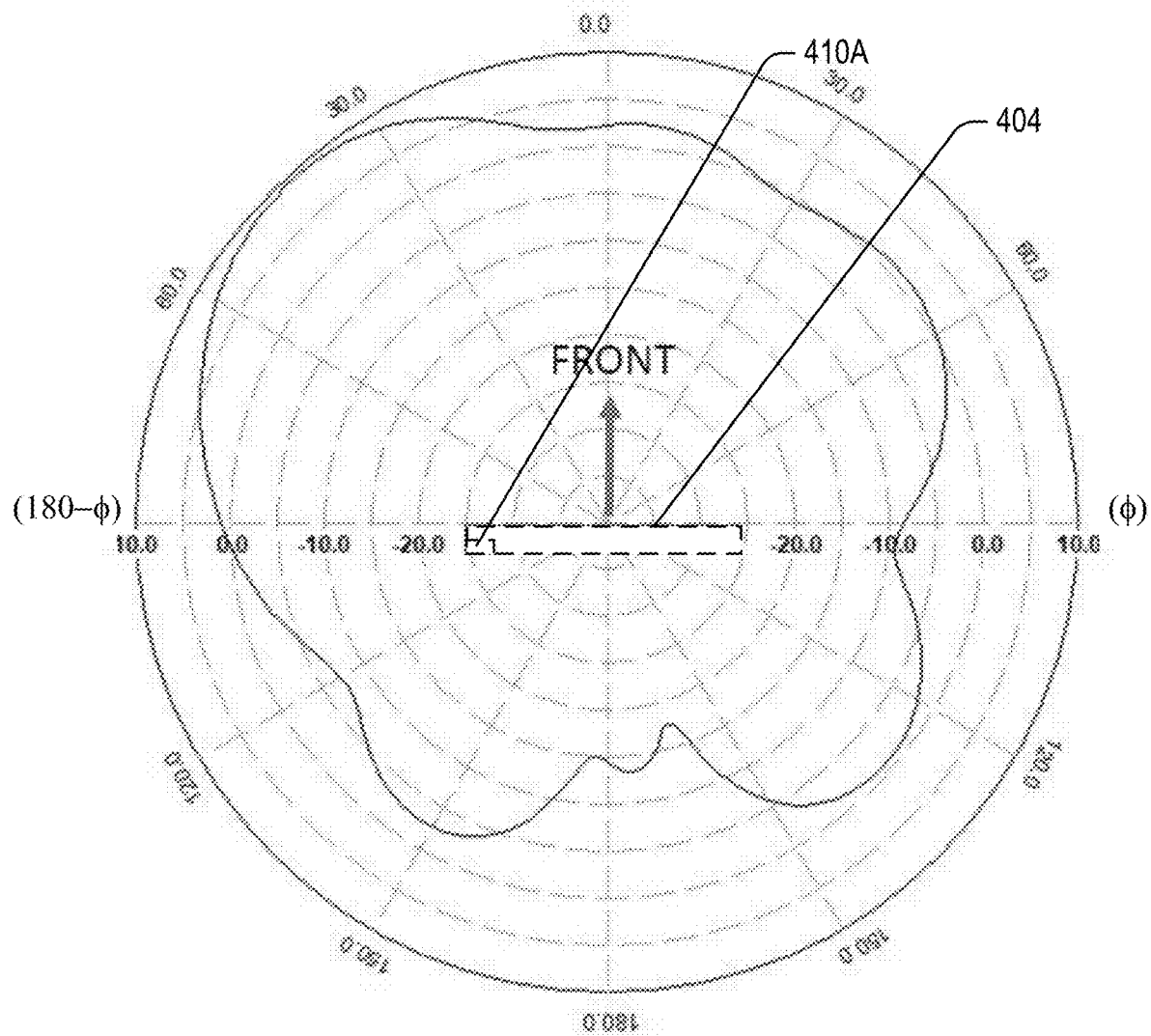
FIG. 5C

PASSIVE DIRECTIVITY ENHANCEMENT FOR WIRELESS DEVICE

FIELD OF THE DISCLOSURE

This document pertains generally, but not by way of limitation, to antenna radiation modification, and more particularly to passive configurations to enhance antenna directivity of a wireless device, such as a mobile phone, tablet, or wireless networking device (e.g., router or access point).

BACKGROUND

Wireless communication devices (referred to herein generally as "wireless devices") include user devices such as mobile phones, tablets, or networking devices such as routers or wireless access points. Such wireless devices generally include multiple antennas. For example, different antennas can be included to support different wireless communication standards or different wireless communication frequency ranges. In another example, such multiple antennas can be used to support multi-input multi-output (MIMO) or beam-steering techniques. In some devices, antenna location or antenna selection is established to facilitate wireless communication when the device is being held in the hand of a user, or nearby a body of the user such as near a torso or head. For example, antenna locations or antenna selection may be established to reduce or suppress transmission of radio frequency or microwave frequency energy in a direction likely to be absorbed by a body of user, either to enhance system efficiency (e.g., reducing losses associated with absorption), or to conform to regulatory requirements concerning such tissue absorption, or both.

SUMMARY OF THE DISCLOSURE

The present inventor has recognized, among other things, that factors such as antenna location or antenna selection in generally available wireless devices can cause various tradeoffs in terms of usable communication range or directivity. For example, an antenna arrangement or selection in a generally available wireless device such as a mobile phone may be arranged to suppress tissue absorption when operated near a head or hand of a user, but perhaps at the expense of communication range or data rate for an embedded wireless networking or Bluetooth® radio.

The present inventor has also recognized that, in some applications, a wireless device may be operating in a location away from a body of a user. For example, a mobile device such as a mobile phone or tablet may be placed on a desk, a table, or a bed-side location such as for communication with other wireless devices such as headphones, a headset, or health monitoring devices such as a smart watch, scale, blood pressure monitor, sleep monitor, or the like. In an example, a wireless device can be located in a bed-side location to communicate with an external or implantable monitoring device located nearby, such as while the user is resting or sleeping. In another example, a wireless device can be mounted to a dashboard or other location in a vehicle, such as wirelessly coupled with a vehicular Bluetooth® hands-free adapter or headset.

The present inventor has recognized that range of communication using either a Bluetooth®-compliant transceiver or wireless networking transceiver may be limited, and a user may desire a greater communication range in a particular direction or when the wireless device is in a particular orientation. The present inventor has also recognized that most users do not want to physically, permanently modify their wireless devices to achieve enhanced communication range. In one approach, a separate active antenna booster device (e.g., having an internal amplifier such as attached to a transceiver or repeater separate from the wireless device) can be used, but such active booster devices can present challenges, such as requiring a battery or other source of power, or requiring use of a cumbersome remote antenna assembly. By contrast, the present inventor has developed apparatus and techniques to provide enhanced wireless communication range without requiring active (e.g., amplifying) circuitry. The apparatus and techniques described herein can provide a simple mechanical and electrical configuration as compared to modifying the wireless device itself or using an active antenna booster device. Generally, the apparatus and techniques described herein can be used to enhance a directivity (e.g., a gain in a particular spatial direction) of a wireless device antenna without requiring modification of the wireless device, using a passive attachment. In an example, the directivity of a first antenna can be enhanced without substantially affecting the directivity or performance of another antenna on or within the wireless device.

In an example, an attachment for a wireless device can include a housing defining a dielectric portion sized and shaped to mate with a wireless device, when the housing is arranged in a first specified orientation, and a conductive region conductively isolated from the wireless device at least in part using the dielectric portion and spaced apart from a surface of the wireless device by a specified distance at least in part using the dielectric region. The conductive region can be truncated in a specified first region aligned with a portion of the wireless device housing a first antenna when the housing is arranged in the first specified orientation, and the conductive region can be present in a specified second region aligned with a portion of the wireless device housing a second antenna to enhance a directivity associated with operation of the second antenna when the housing is arranged in the first specified orientation. In an example, a wireless device can be mated the attachment, In this manner, a directivity associated with operation of the second antenna can be enhanced when the housing is arranged in the first specified orientation using the conductive region that is present in the second specified region.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5A shows a first view of an illustrative example of a monopole-like antenna as in the example of the wireless device of FIG. 4A, but with a separate conductive plane located nearby, the conductive plane extending beyond a boundary of a footprint of the wireless device.

FIG. 5B shows a second view of an illustrative example of a monopole-like antenna as in the example of the wireless device of FIG. 5A, showing a separation between the wireless device and conductive plane.

FIG. 5C shows a corresponding measured radiation pattern (e.g., in a vertical bisecting plane relative to the wireless device orientation overlaid on the plot shown in FIG. 5B), showing enhanced directivity versus the example of FIG. 4B.

DETAILED DESCRIPTION

Figure 1:
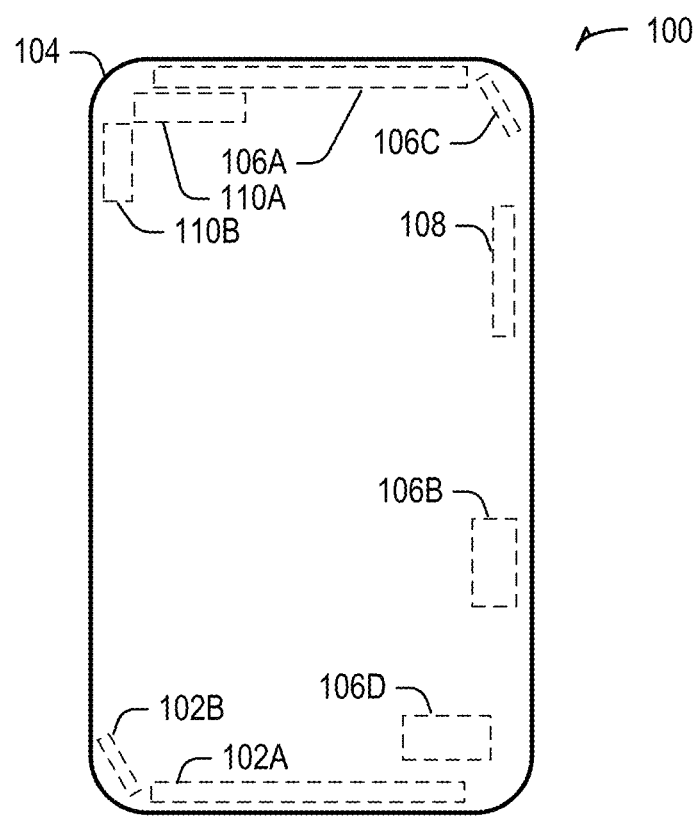
FIG. 1 illustrates generally a wireless device that can include multiple antennas.

FIG. 1 illustrates generally a wireless device 100 that can include multiple antennas. The wireless device 100 can include a mobile phone or tablet, or other devices as mentioned elsewhere herein. As an illustrative example, the wireless device can include first transmit/receive antennas 102A and 102B, such as corresponding to antennas used for communication with a cellular network. The antennas 102A and 102B can be located in a region that is generally away from an ear or hand of a user, as an illustrative example, such as to avoid unwanted signal attenuation or tissue absorption. The wireless device 100 can include receive antennas 106A, 106B, 106C, or 106D, for example, such as to receive transmission from a cellular network. Because tissue absorption is not a concern with the receive antennas, 106A through 106D, such antennas can be located in various positions on or within the wireless device 100, such as on or within a housing 104. The wireless device 100 can include other antennas, such as antennas 110A, 110B for wireless networking or Bluetooth®-compliant communication, such as using an Industrial, Scientific, and Medical (ISM) band allocation. The example of FIG. 1 is merely illustrative, and other antenna arrangements are used in various wireless devices.

FIG. 1 merely shows that antennas can be located in various positions at or near a perimeter or edge of a wireless device 100, and multiple antennas can be used for a particular wireless communication scheme (e.g., multiple transmit, multiple receive, or multiple transmit/receive antennas can be included such as to provide antenna diversity for suppression of fading or multi-path effects, for example).

As mentioned above, the present inventor has recognized that range of communication using either a Bluetooth®-compliant transceiver or wireless networking transceiver or may be limited, and a user may desire a greater communication range in a particular direction or when the wireless device is in a particular orientation. The present inventor has developed, among other things, a passive antenna directivity enhancement structure. The configuration and operation of such a directivity enhancement structure are better understood by way of comparison with simplified antenna structures, as discussed below in relation to FIG. 2A and FIG. 3A, for example.

Figure 2A:
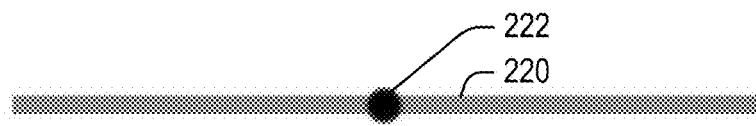
FIG. 2A shows an illustrative example of a dipole antenna.
Figure 2B:
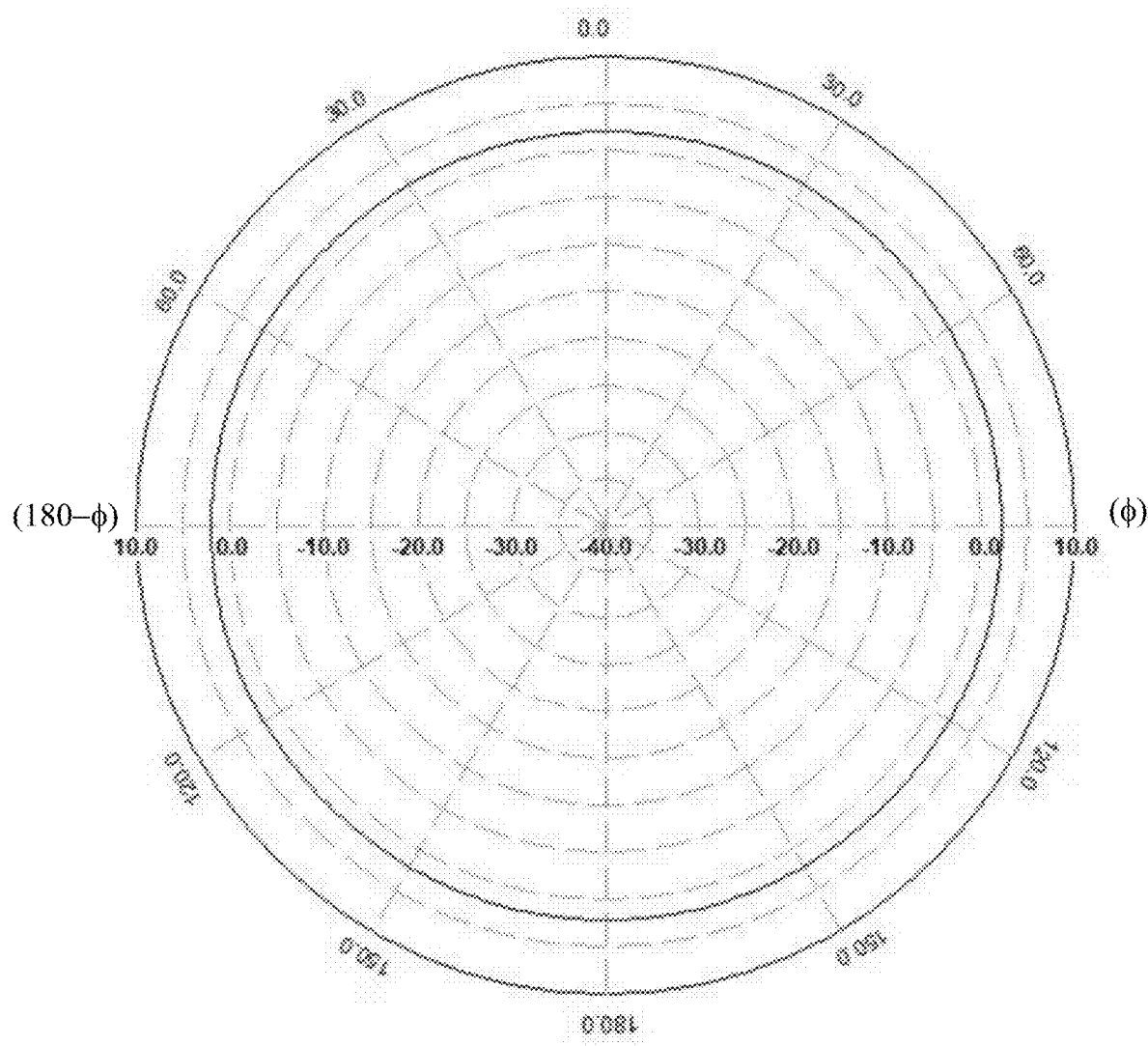
FIG. 2B shows a corresponding simulated radiation pattern (e.g., in a vertical bisecting plane relative to the antenna orientation shown in FIG. 2A).

FIG. 2A shows an illustrative example of a dipole antenna 220 fed at a location 222 (e.g., a balanced feed provides a port defined by two conductors, coupled respectively to the left and right arms of the dipole antenna 220). FIG. 2B shows a corresponding simulated radiation pattern (e.g., in a vertical bisecting plane relative to the antenna orientation shown in FIG. 2A). The dipole antenna 220 radiates uniformly in the plane shown in FIG. 2B. The maximum gain of an antenna, defined in Decibels (dB) relative to an isotropic radiator (dBi) can be defined as antenna efficiency (in Decibels, dB) plus directivity (dBi), and the simulated maximum gain for the dipole antenna 220 is about 1.98 dBi at 2.45 gigahertz (GHz).

Figure 3A:
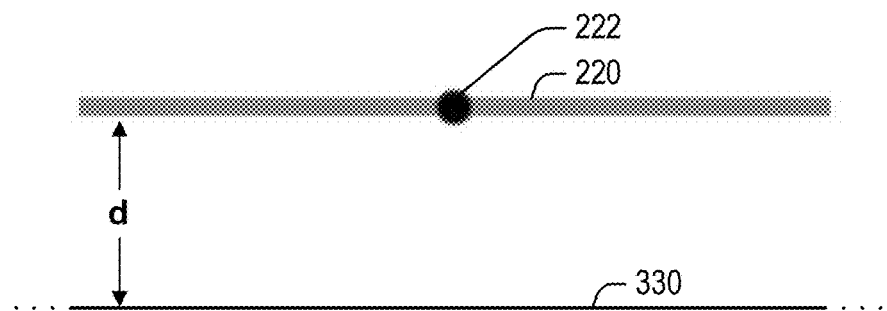
FIG. 3A shows an illustrative example of a dipole antenna located a specified distance from a perfect conducting plane.
Figure 3B:
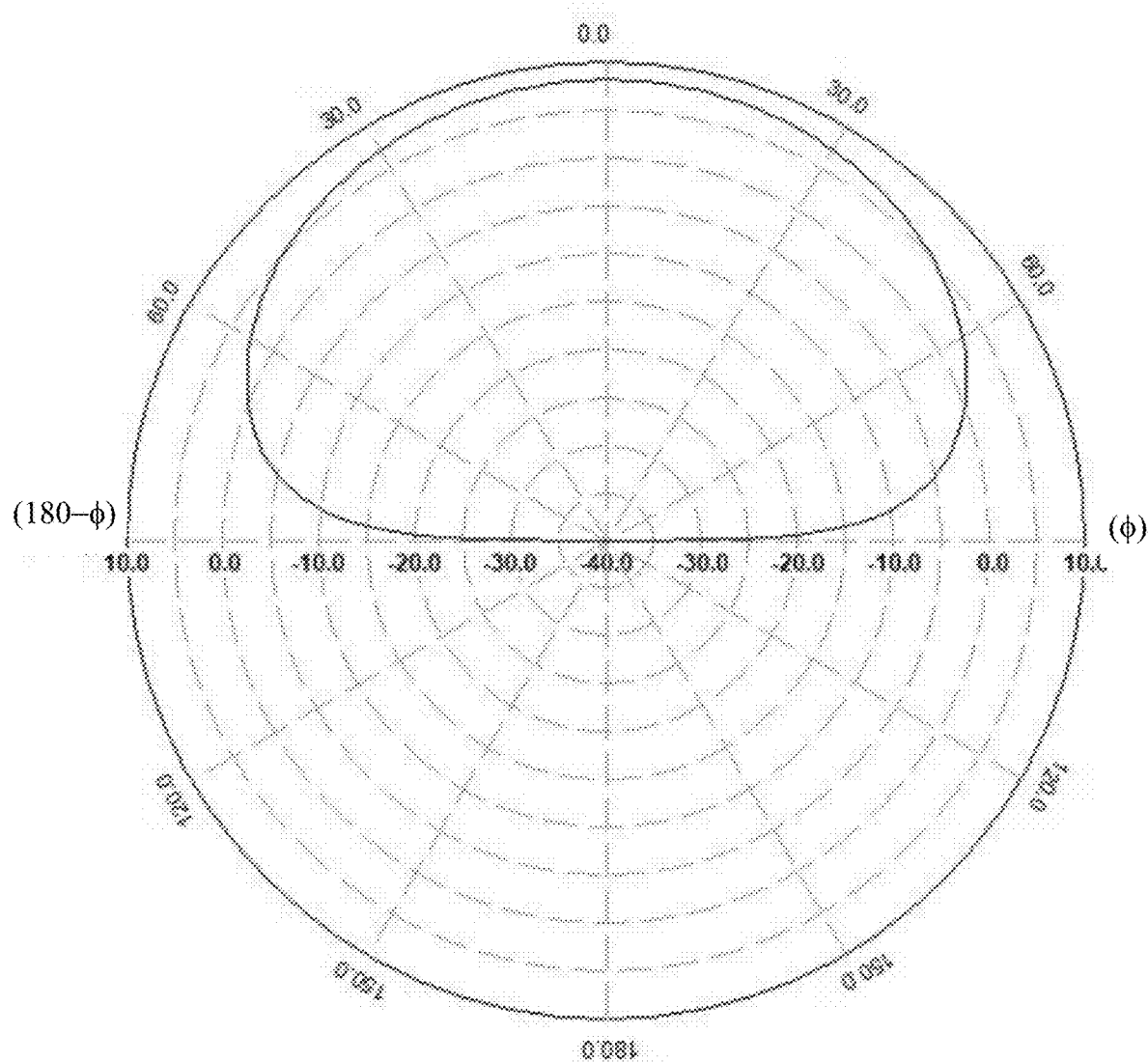
FIG. 3B shows a corresponding simulated radiation pattern (e.g., in a vertical bisecting plane relative to the antenna orientation shown in FIG. 3A), showing enhanced directivity.

By contrast with FIG. 2A, FIG. 3A shows an illustrative example of a dipole antenna 220, again fed at a location 220, where the dipole antenna 220 located a specified distance, "d" from an infinite perfect conducting plane 330. FIG. 3B shows a corresponding simulated radiation pattern (e.g., in a vertical bisecting plane relative to the antenna orientation shown in FIG. 3A), showing enhanced directivity in a direction "above" the dipole antenna 220. The maximum gain achievable using the plane 330 as a reflector or director structure varies depending on the distance, "d." The table below shows various simulated maximum gain values and the corresponding distances.

TABLE 1

Maximum simulated gain versus distance, "d" between dipole antenna and the infinite perfect conducting plane 330.

| Distance "d" (millimeters) | Max, Gain (dBi) |
| --- | --- |
| 30 mm | 7.17 dBi @ 2.45 GHz |
| 25 mm | 7.72 dBi @ 2.45 GHz |
| 20 mm | 8.08 dBi @ 2.45 GHz |
| 15 mm | 8.13 dBi @ 2.45 GHz |
| 10 mm | 7.12 dBi @ 2.45 GHz |
| 5 mm | 1.60 dBi @ 2.45 GHz |

As shown in TABLE 1, a peak maximum gain value occurs at distance, "d" equal to 15 mm, which corresponds to a little less than an eighth (⅛) of a wavelength in free space at 2.45 GHz, and directivity enhancement is achieved when the distance, "d" is ⅛ of a wavelength or more (and even less than ⅛ of a wavelength as indicated by the 10 mm example). As shown by FIG. 3B versus FIG. 2B, the use of the infinite perfect conducting plane 330 increases the maximum gain by over 6 dB, passively (e.g., without requiring an amplifier or other active circuitry). As an illustration, free space wavelengths and corresponding ⅛ wavelength fractions are shown below in TABLE 2.

TABLE 2

Free space wavelength and corresponding 1/8 wavelength values for various frequencies.

| Frequency (GHz) | Free Space Wavelength (mm) | 1/8 Wavelength (mm) |
| --- | --- | --- |
| 2.4 GHz | 125 mm | 15.625 mm |
| 2.45 GHz | 122.445 mm | 15.306 mm |
| 2.50 GHz | 120 mm | 15 mm |

Figure 4A:
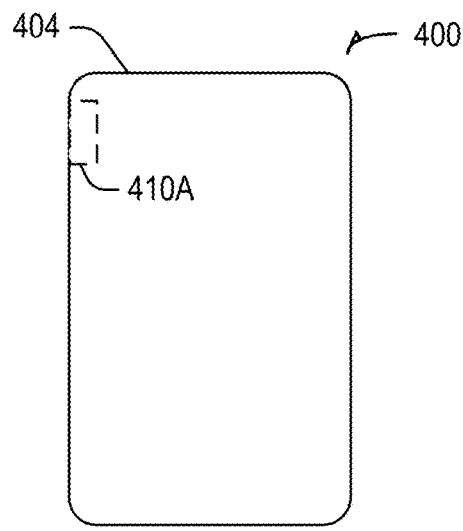
FIG. 4A shows an illustrative example of a monopole-like antenna located near a reference plane (e.g., a ground plane on or within a wireless device).
Figure 4B:
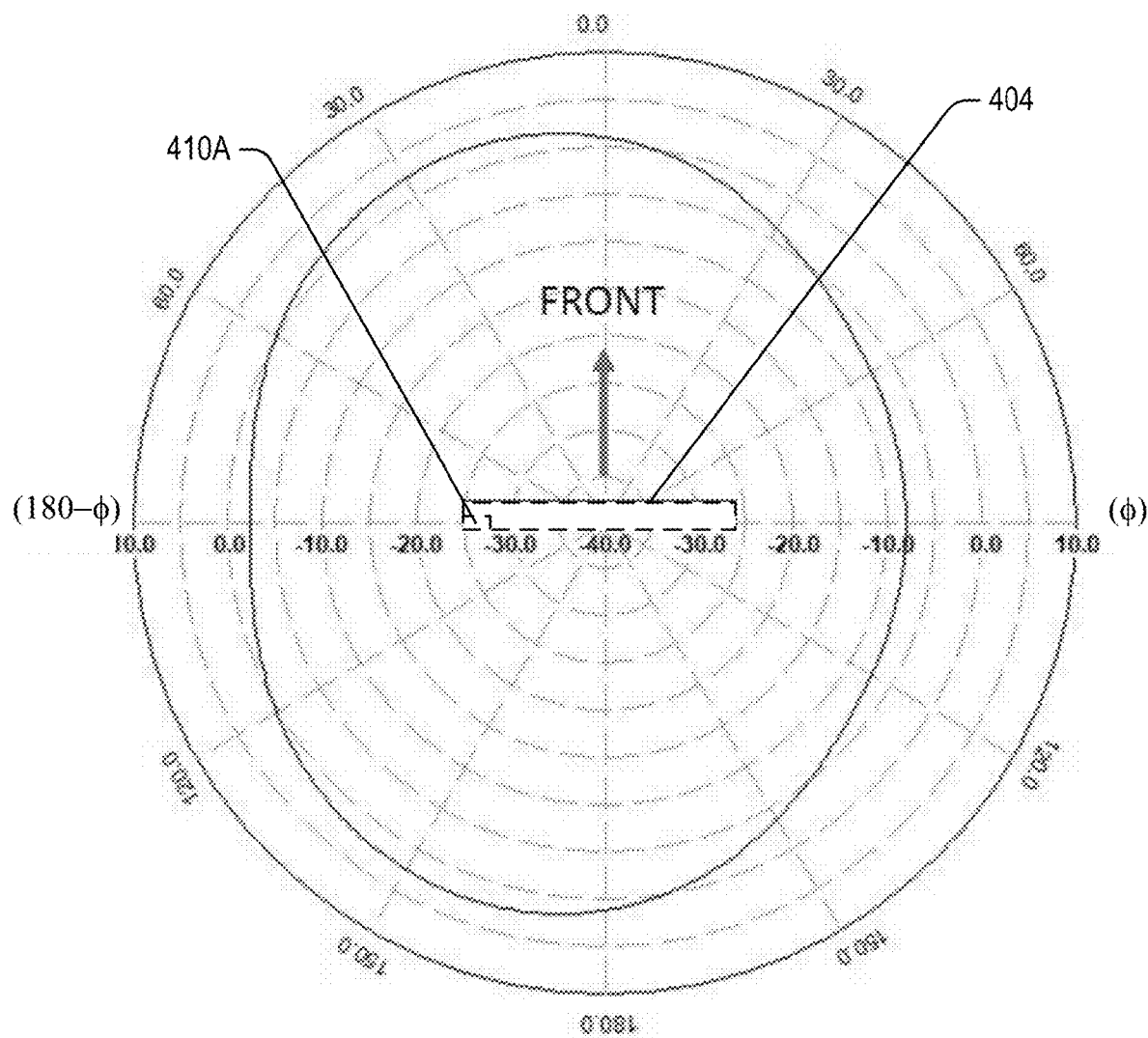
FIG. 4B shows a corresponding measured radiation pattern (e.g., in a vertical bisecting plane relative to the wireless device orientation overlaid on the plot shown in FIG. 4B.

FIG. 4A shows an illustrative example of a monopole-like antenna 410A (e.g., an antenna that can be used for communication when driven by a Bluetooth®-compliant transceiver) located near a reference plane (e.g., a ground plane on or within a housing 404 of the wireless device 400). The phrase monopole-like refers to an antenna structure where a radiating structure such as a conductive line or trace forms one arm of an antenna structure, and a nearby counterpoise such as a ground or reference plane forms another arm. The use of a monopole-like antenna configuration is merely illustrative and other antenna geometries can be used with the attachment shown herein at FIG. 7, for example. FIG. 4B shows a corresponding simulated radiation pattern (e.g., in a vertical bisecting plane relative to the wireless device orientation overlaid on the plot shown in FIG. 4B, where the maximum gain is 3.2 dBi at 2.45 GHz.

FIG. 5A shows a first view of an illustrative example of a monopole-like antenna 410A as in the example of the wireless device 400 of FIG. 4A, but with a separate conductive plane 530 located nearby, the conductive plane 530 extending beyond a boundary of a footprint of the wireless device (e.g., beyond the edges of the housing 404). In FIG. 5A, the conductive plane 530 can extend a specified distance beyond the footprint of the wireless device along one or more edges of the housing 404. For example, the conductive plane 530 can extend a specified distance, "a," beyond a first edge, a specified distance, "b," beyond a second edge, or a specified distance, "c," beyond a third edge, or any combination thereof. In an example, "a," "b," and "c" can be equal, such as corresponding to at least an eighth of a wavelength of a center frequency used for communication by the antenna 410A, at least an eighth of a wavelength of a lowest frequency used for communication by the antenna 410A, or about an eighth of a wavelength of a lowest frequency used for communication by the antenna 410A, for example.

FIG. 5B shows a second view of an illustrative example of a monopole-like antenna 410A as in the example of the wireless device 500 of FIG. 5A, showing a specified separation, "d," between a housing 404 of the wireless device 500 and conductive plane 530. As discussed above in relation to the example of a dipole antenna above a perfect conductor, the specified distance, "d," can be established to enhance a directivity of radiation from the antenna 410A (or by reciprocity, receiving operation). As in the examples of the distances "a," "b," and "c," above, the specified distance "d," can, for example, be at least an eighth of a wavelength of a center frequency used for communication by the antenna 410A, or at least an eighth of a wavelength of a lowest frequency used for communication by the antenna 410A. Note that in FIG. 5A and FIG. 5B, the conductive plane 530 is separate from any ground or reference plane located within the housing 404 of the wireless device 500.

FIG. 5C shows a corresponding simulated radiation pattern (e.g., in a vertical bisecting plane relative to the wireless device orientation overlaid on the plot shown in FIG. 5B), showing enhanced directivity (e.g., a maximum gain of 9.39 dBi at 2.45 GHz) versus the example of FIG. 4B, where "a," "b," "c," and "d" are each 15 mm.

Figure 6:
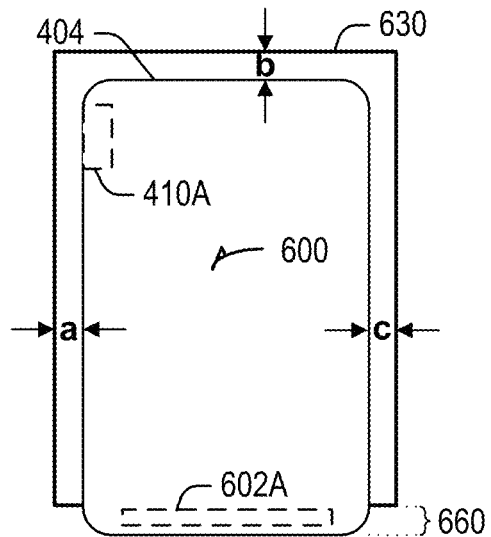
FIG. 6 shows an illustrative example of a monopole-like antenna as in the example of the wireless device of FIG. 4A and similar to the examples of FIG. 5A and FIG. 5B, where a conductive plane extends beyond a boundary of a footprint of the wireless device in specified directions, but in FIG. 6, the conductive plane is truncated or otherwise removed in a specified region aligned with the wireless device housing another antenna.

FIG. 6 shows an illustrative example of a monopole-like antenna 410A as in the example of the wireless device of FIG. 4A and similar to the examples of FIG. 5A and FIG. 5B, where a conductive plane 630 extends beyond a boundary of a footprint of the housing 404 of a wireless device 600 in specified directions, "a," "b," and "c," but in FIG. 6, the conductive plane 630 is truncated or otherwise removed in a specified region 660 aligned with the wireless device, housing another antenna 602A. In the configuration shown in FIG. 6, a first antenna (e.g., antenna 410A) can be located above the conductive plane 630 to have directivity enhancement, and a second antenna (e.g., antenna 602A) can operate with a less modified or unmodified radiation pattern. For example, the antenna 410A can be a wireless networking antenna or an antenna driven by a Bluetooth®-compliant transceiver providing short-range communication with a device nearby the wireless device 600, and the antenna 602A can be a cellular network receive or transmit/receive antenna, such as for communication with a base station or cellular network infrastructure, farther away or otherwise not necessarily benefitting from directivity enhancement. In this manner, the present inventor has recognized that directivity enhancement can be provided passively, and selectively, such as for some but not all antennas located on or within the wireless device 600.

Figure 7:
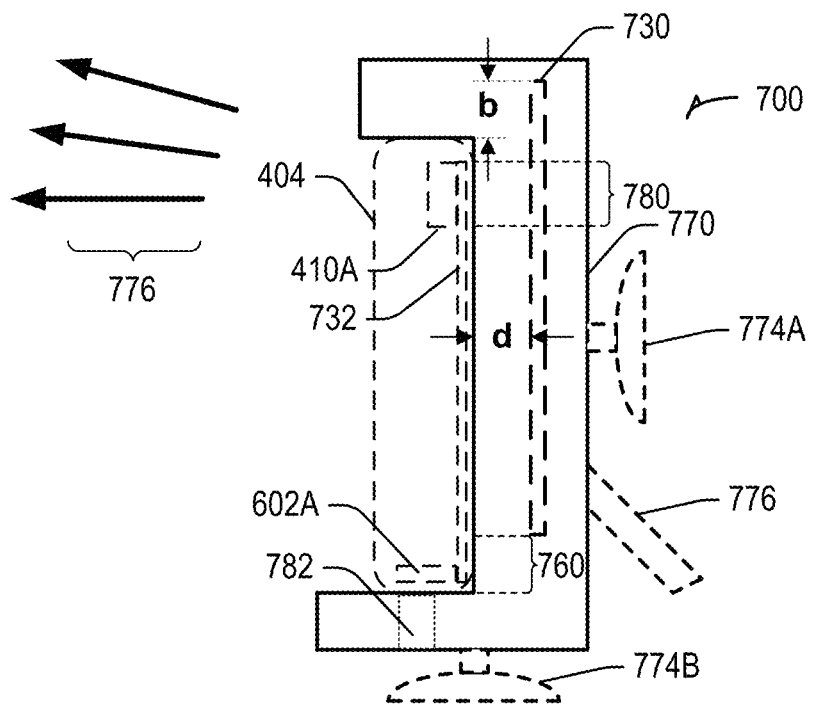
FIG. 7 shows an illustrative example of an attachment for a wireless device, such as to provide enhanced directivity using a conductive structure in a manner similar to the examples of FIG. 5A, FIG. 5B, and FIG. 6.

FIG. 7 shows an illustrative example of an attachment 700 for a wireless device, such as to provide enhanced directivity using a conductive structure in a manner similar to the examples of FIG. 5A, FIG. 5B, and FIG. 6. In FIG. 7, the attachment 700 can include or define one or more features sized and shaped to mate with a housing 404 of the wireless device. For example, the attachment 700 can include a dielectric region 770 such as a hollow or solid polymer structure include features that one or more of cradle, support, clamp, or otherwise mate with the wireless device. For example, the dielectric region 770 can include clamps or other features to retain the wireless device. The dielectric region 770 can include apertures or notches, such as shown at 782, such as to facilitate coupling of a charging or other cables to connectors located on the housing 404 of the wireless device, or permitting usage of microphone, camera, or speaker features of the wireless device, for example. The dielectric portion can be mechanically coupled with, or can include, a conductive region 730. The conductive region 730 can be planar, or curved, and can include a solid metallic structure or a mesh structure, as illustrative examples. A distance, "d," can be established to space the conductive region 730 apart from the housing 404 of the wireless device when the wireless device is mated with the attachment 700.

The conductive region 730 can be conductively isolated from the wireless device, and can be sized and shaped to enhance directivity of a first antenna 410A by being aligned with (e.g., present under a footprint of the first antenna 410A) in the region 780, such as enhancing transmission or reception gain in the direction 776 indicated by arrows. As mentioned elsewhere, a second antenna 602A can be included on or within the wireless device housing 404, such as aligned with a region 760 where the conductive region 730 is truncated. The first and second antennas 410A and 602A can be mounted on or near a printed circuit assembly 732, such as including one or more reference planes separate from the conductive region 730. As in the example of FIG. 6, the attachment 700 can provide enhanced directivity by providing a conductive region 730 spaced apart from the wireless device by the distance, "d," and such as having portions (e.g., in the region noted "b") extending beyond a footprint of the wireless device housing 404 projected onto the conductive region 730.

In this manner passive "boosting" of the antenna gain can be achieved, without requiring active circuitry as a portion of the attachment 700. Other mechanical features can be included to support or anchor the attachment 700, such as a fastener comprising a clip or suction cup (e.g., at locations as shown at 774A or 774B), or a stand 776, such as to support the attachment 700 when placed on a table, nightstand, or other surface. For example, features such as suction cups or the stand 776 may be adjustable or even removable to facilitate different use scenarios such as using the attachment in a home, a healthcare or a commercial setting, or within a vehicle, for example. As in the other illustrations herein, the distances, "b," or "d" as shown in FIG. 7 can be about an eighth of an effective wavelength, or at least an eighth of an effective wavelength, such as corresponding to a lowest frequency or a center frequency used for communication. Such a wavelength is generally an effective wavelength that is shorter than a free-space wavelength where a region between the conductive region 730 and the wireless device housing 404 is either homogeneous polymer material or a combination of a polymer material and air. The "effective wavelength" corresponds to an effective relative dielectric constant of a medium between the conductive region 730 and the device housing 404, such as corresponding to a relative dielectric constant of a polymer material comprising the dielectric region 770 of the attachment 700 or a combination of such polymer material and air.

In the example of FIG. 7, the wireless device housing 404 is shown in a particular orientation. The attachment 700 can be configured to allow the wireless device housing to be rotated or flipped, for example, such as to place the antenna 602A nearby the conductive region 730 at the region 780 and the antenna 410A nearby the truncated region 760 of the conductive region 780. In this manner, directivity of the communication by antenna 602A can be selectively enhanced while suppressing modification of the directivity of the communication using antenna 410A.

Figure 8:
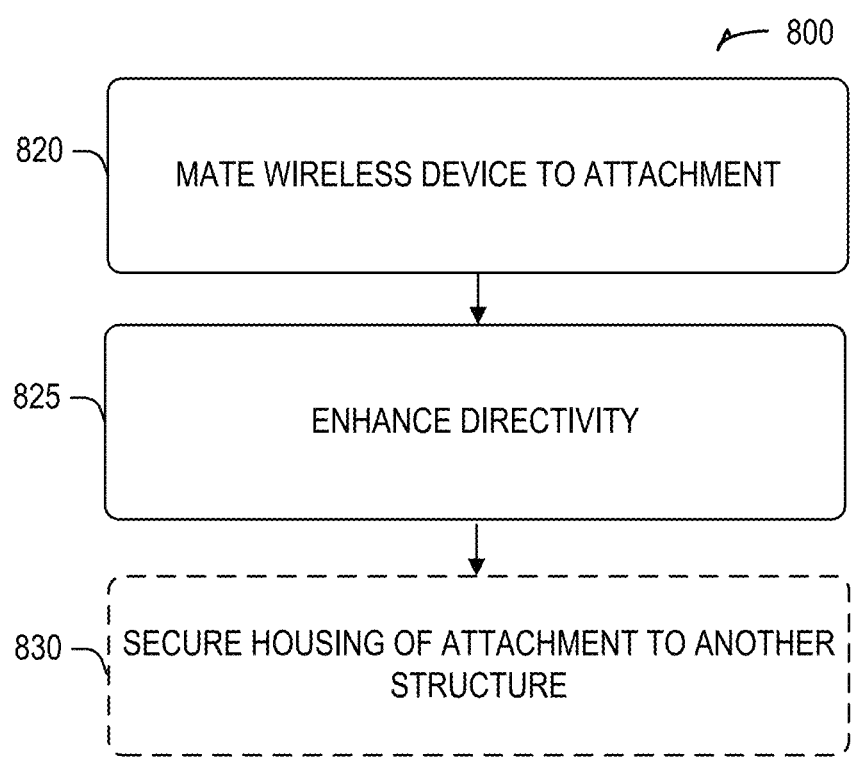
FIG. 8 illustrates generally a technique, such as a method, comprising mating a wireless device to an attachment, such as the attachment shown in FIG. 7, and operating the wireless device with enhanced directivity.

FIG. 8 illustrates generally a technique 800, such as a method, comprising mating a wireless device to an attachment at 820, such as the attachment 700 shown in FIG. 7, and operating the wireless device with enhanced directivity 825, such as provided by a configuration of the attachment 700 shown in FIG. 7. Optionally, such as at 830, the housing of attachment 700 of FIG. 7 can be secured to another structure, such as with a fastener as mentioned above in relation to FIG. 7.

Various Notes

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An attachment for a wireless device, the attachment comprising:
   a housing defining a dielectric portion sized and shaped to mate with a wireless device, when the housing is arranged in a first specified orientation;
   a conductive region conductively isolated from the wireless device at least in part using the dielectric portion and spaced apart from a surface of the wireless device by a specified distance at least in part using the dielectric region;
   wherein the conductive region is truncated in a specified first region aligned with a portion of the wireless device housing a first antenna when the housing is arranged in the first specified orientation; and
   wherein the conductive region is present in a specified second region aligned with a portion of the wireless device housing a second antenna to enhance a directivity associated with operation of the second antenna when the housing is arranged in the first specified orientation.

2. The attachment of claim 1, wherein near the specified second region, the conductive region extends beyond a boundary defined by a footprint of the surface of the wireless device projected onto the conductive region.

3. The attachment of claim 2, wherein a distance that the conductive region extends beyond the boundary defined by the footprint of the surface of the wireless device is at least the same distance as the specified distance between the conductive region and the surface of the wireless device.

4. The attachment of claim 2, wherein the conductive region extends beyond the boundary defined by the footprint of the surface of wireless device on multiple sides of the footprint of the wireless device.

5. The attachment of claim 1, wherein the specified distance is at least one eighth of a wavelength of a lowest frequency used by the second of the wireless device.

6. The attachment of claim 1, wherein the housing defines a cradle supporting the wireless device.

7. The attachment of claim 1, wherein the housing defines a feature to retain the wireless device.

8. The attachment of claim 1, wherein the housing defines a feature to allow interconnection between the wireless device and a power supply.

9. The attachment of claim 1, comprising a fastener to secure the housing to another structure.

10. The wireless device attachment of claim 1, wherein the housing can be rotated to mate with the wireless device in two or more different orientations.

11. An apparatus, comprising:
an attachment for a wireless device, the attachment comprising:
a housing defining a dielectric portion sized and shaped to mate with a wireless device, when the housing is arranged in a first specified orientation; and
a conductive region conductively isolated from the wireless device at least in part using the dielectric portion and spaced apart from a surface of the wireless device by a specified distance at least in part using the dielectric region; and
the wireless device;
wherein the conductive region is truncated in a specified first region aligned with a portion of the wireless device housing a first antenna when the housing is arranged in the first specified orientation; and
wherein the conductive region is present in a specified second region aligned with a portion of the wireless device housing a second antenna to enhance a directivity associated with operation of the second antenna when the housing is arranged in the first specified orientation.

12. The apparatus of claim 11, wherein the wireless device comprises a cellular device or a tablet device.

13. The apparatus of claim 12, wherein the first antenna comprises a cellular network antenna electrically coupled to a cellular network communication circuit within the wireless; and
wherein the second antenna comprises a short-range wireless network antenna, the short-range wireless network antenna electrically coupled to a short-range wireless communication circuit within the wireless device.

14. The apparatus of claim 11, wherein the wireless device comprises at least one of a wireless network access point or a wireless network router.

15. The apparatus of claim 11, wherein the dielectric portion can be rotated to mate with the wireless device in a second specified orientation, wherein the conductive region truncated in the specified first region is aligned with the portion of the wireless device housing the second antenna when the housing is arranged in the second specified orientation.

16. A method, comprising:
mating a wireless device to an attachment, the attachment comprising:
a housing defining a dielectric portion sized and shaped to mate with the wireless device, when the housing is arranged in a first specified orientation; and
a conductive region conductively isolated from the wireless device at least in part using the dielectric portion and spaced apart from a surface of the wireless device by a specified distance at least in part using the dielectric region, the conductive region truncated in a specified first region aligned with a portion of the wireless device housing a first antenna when the housing is arranged in the first specified orientation, and the conductive region present in a specified second region aligned with a portion of the wireless device housing a second antenna; and
enhancing a directivity associated with operation of the second antenna when the housing is arranged in the first specified orientation using the conductive region that is present in the second specified region.

17. The method of claim 16, wherein near the specified second region, the conductive region extends beyond a boundary defined by a footprint of the surface of the wireless device projected onto the conductive region.

18. The method of claim 16, wherein the specified distance is at least one eighth of a wavelength of a lowest frequency used by the second of the wireless device.

19. The method of claim 16, wherein the housing defines a cradle; and
wherein the method comprises supporting the wireless device using the housing.

20. The method of claim 16, comprising securing the housing to another structure.

* * * * *